July 10, 1928.
T. B. TIEFENBACHER
LOCKING COUPLING
Filed Oct. 28, 1925
1,676,585
Fig.1,
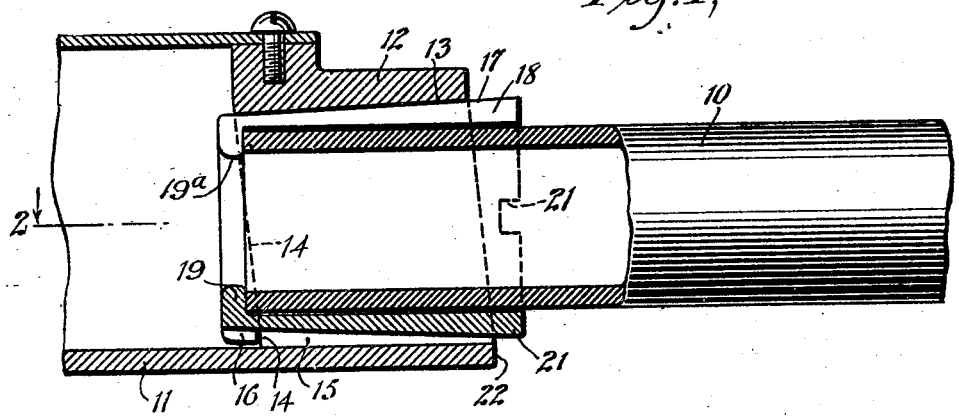
Fig.2,
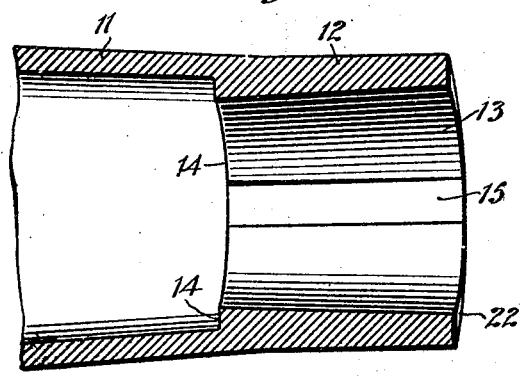
Fig.3,
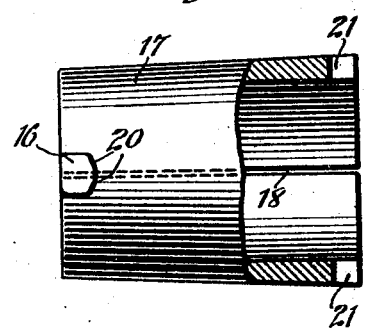
Fig.4,
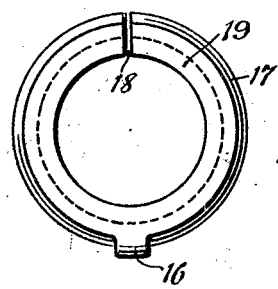
Fig.5,
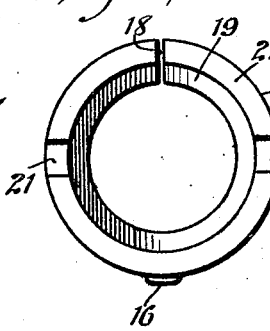
Fig.6.
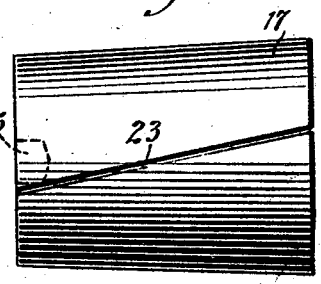
WITNESSES
Edw. Thorpe
Franklin J. Foster
INVENTOR
Thomas B. Tiefenbacher
BY
ATTORNEYS Patented July 10, 1928.

1,676,585

UNITED STATES PATENT OFFICE.

THOMAS B. TIEFENBACHER, OF NORTH ELIZABETH, NEW JERSEY.

LOCKING COUPLING.

Application filed October 28, 1925. Serial No. 65,393.

The present invention is concerned with the provision of a locking coupling for attaching the end of a pipe to a fitting without the necessity for threading either the pipe end or the fitting.

An object of the invention is to provide a device of this character which will serve to securely grip and hold a pipe, a coupling device which will present no sharp internal edges likely to bind or tear the coverings of wires or other materials passed through the pipe, a coupling which permits the rapid locking together of a pipe and fitting, a coupling which is of extremely simple and practical construction, which will be rugged, durable and efficient in use, and which is well suited for economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein, Fig. 1 is a view in longitudinal section showing a pipe and fitting locked together by my improved coupling device.

Fig. 2 is a fragmentary longitudinal sectional view through one end of the fitting, taken on the line 2—2 of Fig. 1.

Fig. 3 is a side elevational view of the tapered split bushing, parts of the bushing being broken away and in section for clearness.

Fig. 4 is an end view of the bushing taken from the reduced end of the same.

Fig. 5 is a similar view with the position of the bushing reversed.

Fig. 6 is a view in side elevation of a slightly modified type of bushing.

In the drawings I have used the reference character 10 to designate a pipe which may be formed of any conventional or appropriate material. The coupling member or fitting indicated at 11 is subject to a wide variety of variations, and as the description proceeds, it will be evident that the pipe 10 might be secured to practically any style of coupling or stationary outlet device by means embodying the present invention.

As best seen in Fig. 2, the coupling member 11 is provided with a pipe receiving socket end 12, internally tapered as indicated at 13. The tapering walls of the socket portion 13 define a shoulder 14 at the interior of the coupling member 11, and this shoulder acts as a cam surface, as will be more fully apparent hereafter. The conically tapered interior wall 13 of the socket portion 12 is provided with a longitudinally extending groove 15 in one wall thereof. This groove is adapted to accommodate the stud member 16 projecting from the exterior of the smaller end of a bushing 17. Bushing 17 is conically tapered on its exterior surface to mate with the tapered wall 13 of the socket, and is internally cylindrical for the reception of an end of the pipe 10.

The bushing 17 is split, being provided with a slot 18 extending throughout its entire length. This slot permits circumferential contraction of the bushing to tightly grip the pipe end when the bushing is forced inwardly against the tapering wall 13 of the coupling member. As noted above, the shoulder 14 acts as a cam surface, the low side of the cam being at the point of intersection of the groove 15 with the shoulder and the high side of the cam being at a diametrically opposite point. When the bushing is inserted in the socket end of the coupling member, the lug 16 passes through the groove 15, and when the bushing is pushed all the way in, this lug will just clear the low side of the cam shoulder 14. It will thus be seen that rotation of the bushing in either direction will act through the lug 16 and cam shoulder 14 to move the bushing inwardly and force it into tight engagement with the tapered surface 13 whereby the bushing is contracted to tightly grip the end of pipe 10.

In Fig. 1 I have shown the bushing manually slid into position, the pipe 10 in place abutting an inturned shoulder 19 at the inner end of the bushing, and the stud 16 disposed at the low side of the cam 14. It will be noted that the internal diameter of the flange 19 when contracted is slightly less than the internal diameter of the pipe 10, and that the inner face of the flange 19 is rounded and bevelled at 19ᵃ so that there will be no projecting corners upon which an electric wire covering might be torn. The stud is preferably formed with oppositely directed camming faces 20 for engagement with the shoulder 14, whereby rotation of the bushing in either direction will draw the same inwardly and circumferentially contract it to effect gripping of the pipe. Arranging the shoulder 14 so that it acts as a two-way cam, or acts to shift the bushing inwardly when the latter is rotated in either direction, makes the coupling very easy to apply. The outer larger end of the bushing may be formed with notches 21 for the reception of a spanner wrench of any convenient type for rotating the coupling to tighten it and lock the pipe.

In Fig. 1 I have illustrated a detail of construction by which I provide for a uniform gripping surface about the entire circumference of the bushing. It will be noted that when the bushing is in its innermost position with the stud 16 resting on the high side of the cam, the portion of the bushing which aligns with the low side of the cam will have less bearing surface in the socket member 12 than the opposite portion of the bushing. To compensate for this difference, I incline the outer end 22 of the socket member in accordance with the inclination of the cam shoulder 14. Thus the distance between any point on the surface 22, and the aligned point on the cam shoulder 14, will be equal, and the bushing will have equal support throughout its entire circumference.

The modification of Fig. 6 consists merely in slotting the bushing at an angle to the longitudinal axis thereof, the diagonal slot being shown at 23. This construction is thought to give a little more resistance to rotational unlocking of the bushing, inasmuch as the binding of the edges of the diagonal slot increases the torque necessary to effect such unlocking.

Various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim:

1. A pipe coupling, comprising a fitting having a smooth, conical socket provided with a shoulder having a cam surface at its inner end and a longitudinal groove extending throughout the length of the socket, and a conical split bushing adapted to encircle the end of a pipe, said bushing having a smooth exterior surface and provided at its inner smaller end with an exterior laterally projecting lug, said lug adapted when the bushing and pipe are inserted in the socket, to engage the cam surface of the shoulder of the socket, whereby when the bushing is turned it will be drawn into the socket in tight engagement therewith and effect contraction of the bushing and gripping of the pipe.

2. A pipe coupling, comprising a fitting having a smooth conical socket provided at its inner end with a shoulder having a tapering face and with a longitudinal groove extending through the tapering face of the shoulder and forming said face into a two-way cam, and a conical split bushing adapted to encircle the end of a pipe, said bushing having a smooth exterior surface and provided at its inner smaller end with an exterior lateral lug adapted when the bushing and pipe are inserted in the socket to lie at the inner face of said shoulder, whereby the bushing may be turned in either direction to engage the lug with a part of the cam to draw the bushing into tight engagement with the socket and in clamping engagement with the pipe.

THOMAS B. TIEFENBACHER.